United States Patent [19]

Danielsen

[11] 4,385,230

[45] May 24, 1983

[54] DIGITAL TEMPERATURE EFFECT GENERATOR

[75] Inventor: Carl M. Danielsen, Prospect Heights, Ill.

[73] Assignee: GTE Automatic Electric Labs. Inc., Northlake, Ill.

[21] Appl. No.: 220,482

[22] Filed: Dec. 29, 1980

[51] Int. Cl.³ ............................................. H04M 3/32
[52] U.S. Cl. ........................ 235/92 TE; 179/175.3 R; 375/10; 377/20; 377/50
[58] Field of Search ...................... 235/92 TE, 92 LG; 179/175.3 R, 170 R, 170 F; 375/10; 328/39, 42, 48, 55; 307/220 R, 222 R, 225 R

[56] References Cited

U.S. PATENT DOCUMENTS 3,496,308 2/1970 Godfrey ........................... 179/170 F
3,842,247 10/1974 Anderson ............................... 375/10
3,851,120 11/1974 Crosley .......................... 235/92 TE

FOREIGN PATENT DOCUMENTS 2823837 12/1979 Fed. Rep. of Germany ... 179/175.3 R
1385537 2/1975 United Kingdom ......... 179/175.3 R
535742 11/1976 U.S.S.R. ....................... 179/175.3 R
562924 6/1977 U.S.S.R. ....................... 179/175.3 R Primary Examiner—Howard Britton
Attorney, Agent, or Firm—Robert J. Black; Charles A. Doktycz

[57] ABSTRACT

A circuit for simulating the effects of a temperature change in a digital transmission medium. The circuit generates lengthened or shortened frequency pulses digitally by operating a pulse counter to reset early for a shortened pulse or skip a timing pulse for a lengthened interval pulse. A second counter and associated decoder are utilized to alternately control the operating modes.

12 Claims, 5 Drawing Figures

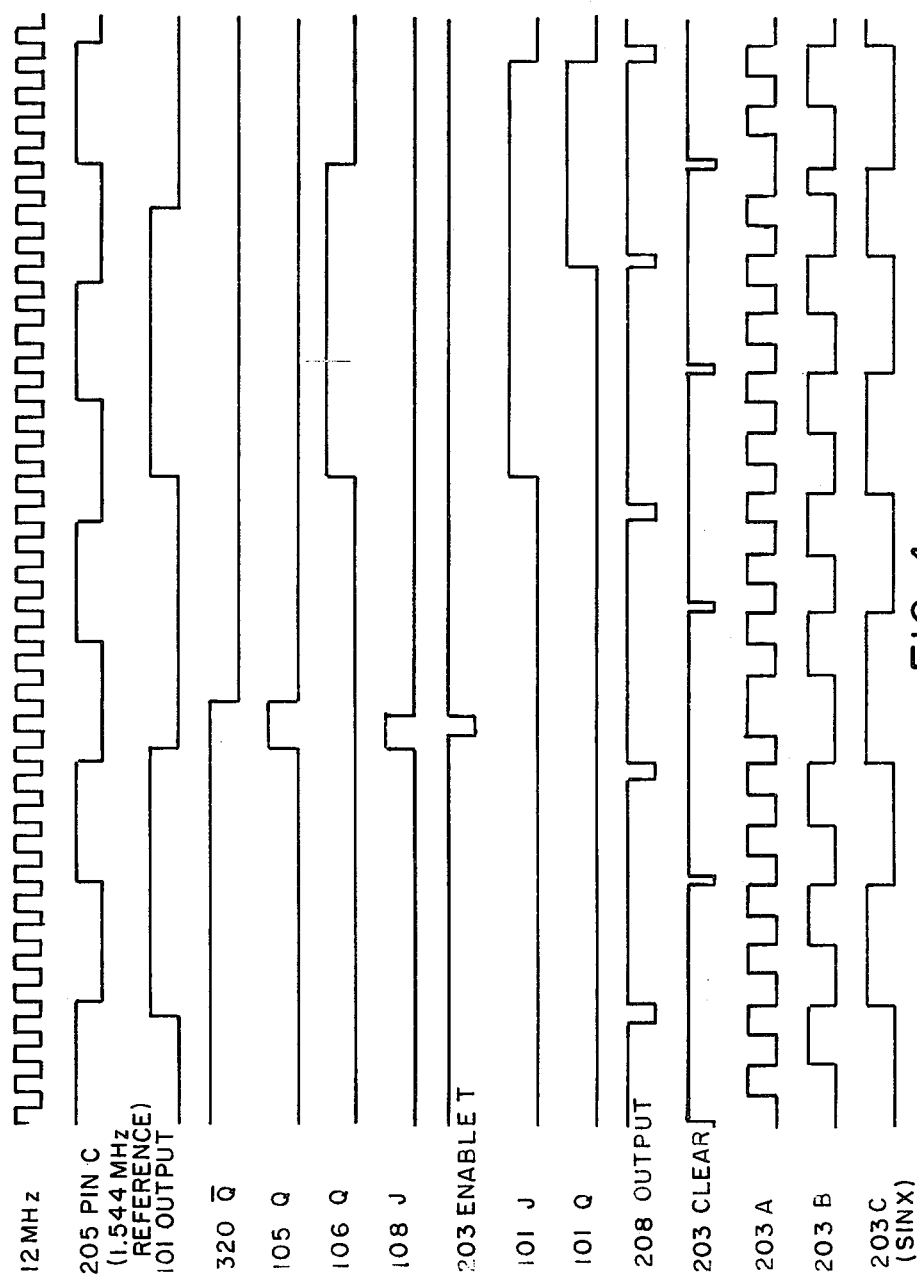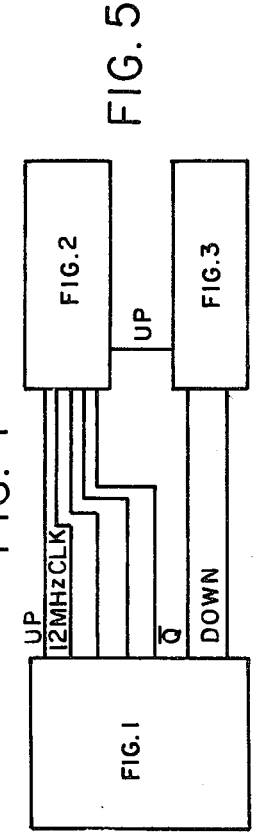

DIGITAL TEMPERATURE EFFECT GENERATOR

BACKGROUND OF THE INVENTION

1. Field of the Invention

The present invention relates in general to telephone systems utilizing Tl type carrier communication links, and more particularly to an arrangement for testing the digital trunk units terminating these links to ensure their proper operation.

2. Description of the Prior Art

Digital transmission such as used on a Tl type span line is effected by changing temperatures. As the temperature on a Tl span line increases the delay associated with the line increases. When the temperature decreases the delay decreases. With a constant temperature, PCM data is sent over a Tl span to a Digital Trunk Unit (DTU) at the rate of 1.544 Mhz. When the temperature is increasing the PCM data appears to be sent to the DTU at a slightly lower rate than usual. As the temperature decreases the PCM data appears to be sent at a rate slightly higher than 1.544 Mhz. The DTU contains a line compensator which consists of a first in-first out buffer to allow for discrepancies in the send and receive rates. If PCM data is sent to the DTU at a slightly slower rate than the DTU receive rate (1.544 Mhz) this buffer will eventually empty and PCM data will be lost, or at least mutilated in that the equipment will "stuff pulses" to make up the void. On the other hand if PCM data is sent to the DTU slightly faster than 1.544 Mhz the buffer will eventually fill up and PCM data will be lost. The change in delay for a 400 mile Tl span line with a 70° F. change in temperature is the equivalent of 96 bits of PCM data. This change is easily handled by the line compensator.

To determine that the DTU is operating properly, equipment capable of simulating the effects of temperature upon the transmission media is required.

In the past, an analog circuit was used to simulate temperature effects. The analog circuit contained a phase shifter which shifted a clock signal 360° to the right for an increase in time and then switched to an unshifted clock while the phase shifter shifted 360° to the left. Every time this cycle occurred a clock pulse would be lost. After 96 of these pulses were lost the Digital Trunk Unit would fail. This process required 77 minutes for each trunk to fail. In the normal testing mode the circuit was allowed to run until the Digital Trunk Unit failed.

Other problems with analog circuits have to do with adjustments to the analog phase shifter. A ramp voltage is presented to the phase shifter to determine the amount of phase shift. When the ramp reaches a point corresponding to a 360° phase shift the ramp is reset until it reaches a point corresponding to a 0° phase shift. The adjustments to set the 360° and 0° points on the ramp are very critical and because of this are difficult to adjust. Another of the problems have to do with noise on the ramp voltage waveform. The adjustments are so critical that they cannot be made when the card is on a slot extender.

SUMMARY OF THE INVENTION

Accordingly, it is an object of the present invention to provide an arrangement that is capable of testing the time compensator of a digital trunk unit that is easier to set up and operate.

It is another object of the present invention to perform these tests with a considerable saving in time.

These objects are achieved by providing a novel digital temperature effect generator circuit that tests the line compensator by first simulating a 70° F. increase in temperature and then a 70° F. decrease, every two seconds.

The Digital Temperature Effect Generator contains a digital phase shifter which shifts a clock pulse 45° every 1.3 milliseconds. The Digital Temperature Effect Generator shifts pulses in one direction until 96 pulses are lost and then shifts pulses in the other direction until 96 pulses are gained. By this method the Digital Temperature Effect Generator goes through a test cycle in 2 seconds and can be left running continuously without a digital trunk failure (assuming a good Digital Trunk Unit). This advantage of the digital phase shifter in inserting a delay rather than holding a delay as in the analog circuit accounts for a great saving in testing time. Any number of phase shifts can be inserted by the digital phase shifter whereas the analog phase shifter was limited to 360°.

The Digital Temperature Effect Generator (DTEG) consists of four sections: the digital phase shifter, the rate generators, the missing pulse counter and the shift direction decoder. The DTEG simulates the effect of a 70° F. change in temperature on a Tl span in the following manner: The DTEG utilizes a 12.35 Mhz clock that is normally divided by eight to provide a 1.544 Mhz signal, to clock PCM data going out to the DTU under test. When the DTEG is simulating an increase of temperature on the Tl span, the digital phase shifter ($\div 8$ counter) occasionally misses a 12 Mhz clock pulse. This causes one output pulse to be $\frac{1}{8}$ longer than normal and consequently shifts all subsequent pulses $\frac{1}{8}$ period.

When the DTEG is simulating a decrease in temperature, the digital phase shifter divides by 7 instead of 8 for one pulse every millisecond. This causes one of the outgoing pulses to be $\frac{1}{8}$ shorter than normal. After eight pulses are shortened it will appear to the DTU that one pulse is missing. Likewise when eight pulses are lengthened it will appear to the DTU that there is one extra pulse. The rate generators determine how often the output pulses are shortened or lengthened. When the counter counts 768 pulses being shortened by $\frac{1}{8}$ (equivalent to 96 missing pulses), the direction decoder changes its output so that 768 pulses are lengthened. This process repeats every two seconds. Since the DTEG simulates increases and decreases in temperature alternately the line compensator buffer should never fill up or completely empty.

DESCRIPTION OF THE DRAWINGS

FIG. 4 is timing chart showing the pulse forms at various points within the circuit.

FIG. 5 is a block diagram showing the interconnection of FIGS. 1, 2 and 3.

DESCRIPTION OF THE PREFERRED EMBODIMENT

Figure 1:
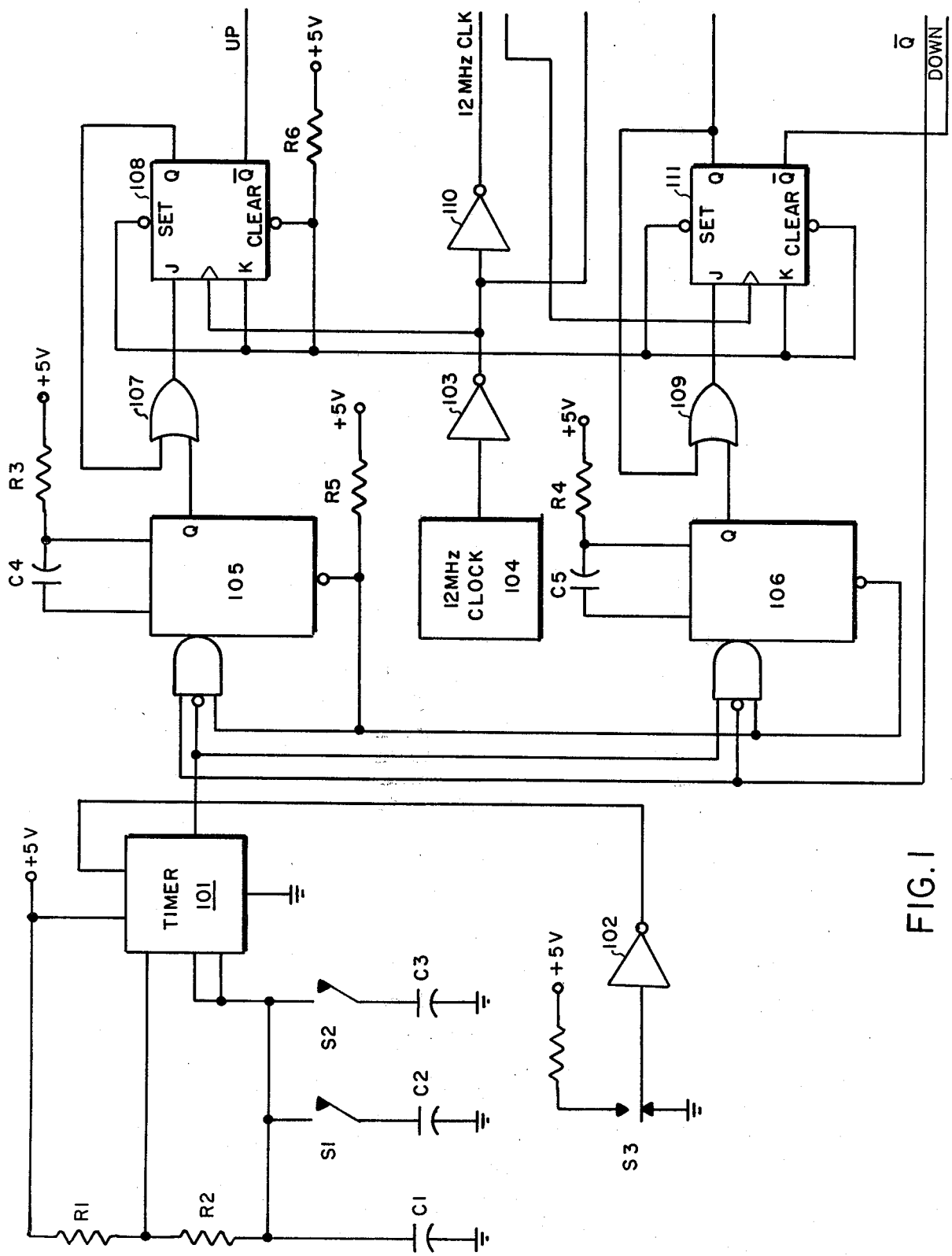
FIGS. 1, 2 and 3 show in schematic form the circuit of the present invention.
Figure 2:
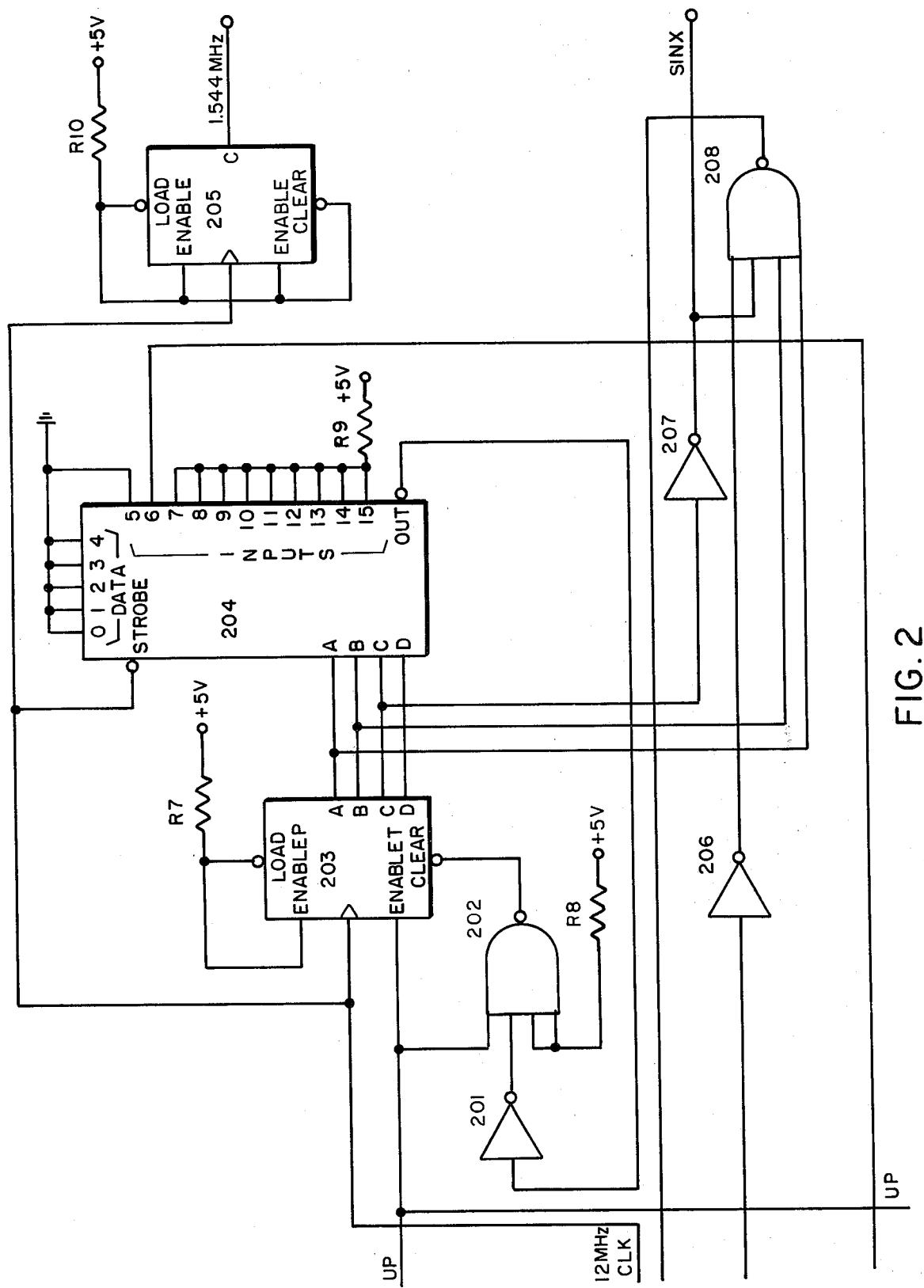
Figure 3:
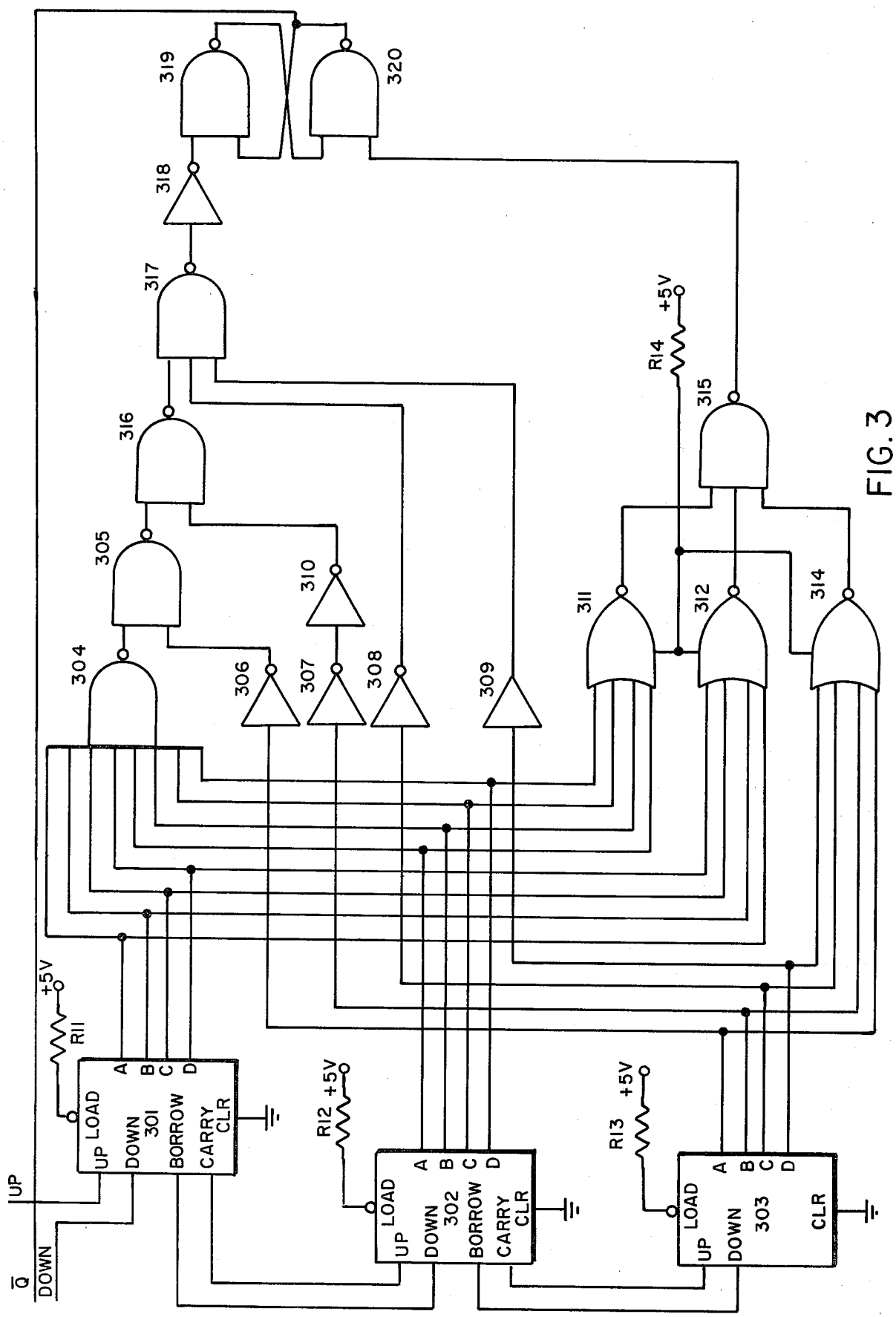

The starting point for the circuit is the basic clock. The rate at which the clock is shifted back and forth is set by a 555 timer chip 101. The 555 timer is used as a free running oscillator with the frequency being set by capacitors C1, C2 and C3 and the total capacitance seen from the timer 101 pins 2 and 6 to ground. This capacitance is selected by the setting of switches S1 and S2 and is found by adding the capacitances switched into the circuit along with capacitor C1. If, for example, switches S1 and S2 are closed the total capacitance is equal to C1+C2+C3=0.0001+0.1+5.6 ufd or 5,7001 ufd. The switches S1 and S2 are used to change the frequency at which the 1.544 mhz clock shifts back and forth. The rate at which the clock shifts represents the rate at which the temperature on a T1 span would be increasing or decreasing. The exact rate at which the clock shifts is not critical and a faster shift rate results in an accelerated test. The slower rates are used to observe the temperature effect on an oscilloscope. In an alternate version a more accurate and programmable clock source may be used in place of the 555 timer. The frequency of the 555 timer is shown in the table below for the available switch settings.

| S1 | S2 | Frequency |
|---|---|---|
| open | open | 774 khz |
| open | closed | 13.8 hz |
| closed | open | 773 hz |
| closed | closed | 13.6 hz |

$$\text{Frequency} = \frac{1.44}{(R1 + 2R2) \text{ (total)}} = \frac{77.42}{\text{(total)}}$$

The —TEMPON signal going into gate 102 is used to turn the temperature effect off and on. Gate 102 is an inverter so that if —TEMPON is grounded the temperature effect will be generated. If —TEMPON is tied to a logic one, operation is inhibited and the shifting of the 1.544 mhz is stopped.

The $\overline{Q}$ output signal from gate 320, is used to determine the direction in which the 1.544 Mhz clock is being shifted. How $\overline{Q}$ is derived will be described later, for now it will suffice to say that $\overline{Q}$ stays high for 768 shifts, then goes low for 768 shifts and so on. $\overline{Q}$ enables one of the pulse generators, 105 or 106 depending on its value. If $\overline{Q}$ is high and the output of timer 101 goes low, flip-flop 105 produces a one hundred nanosecond pulse. The length of the pulse is determined by capacitor C4 and resistor R3. If $\overline{Q}$ is low and the timer 101 output goes high flip-flop 106 produces a 700 nanosecond pulse. These pulses are used to cause a shift in the 1.544 Mhz clock. The 100 nanosecond pulse from FF 105 is synchronized by OR gate 107 and FF 108 and eventually causes the clock to shift left. The 700 nanosecond output pulse from 106 is sychronized by OR gate 109 and FF 111 and causes the clock to shift right. The Q output of FF 108 is normally low. When FF 105 output Q goes high, the output of OR gate 107 goes high (see timing diagram FIG. 4). This causes FF 108 output Q to go high when the −12 Mhz clock goes low. Some time after FF 108 clocks a one through (to FF 121 output Q) the output of one shot 105 goes low, but the output of OR gate 107 stays high until FF 108 is clocked again. At this time the output of FF 108 toggles and will stay low until one shot 105 again goes high. FF 108 output $\overline{Q}$ will go low for exactly one clock period and is used to disable the four bit binary counter 203 for one clock period (12 Mhz clock). Since one 12 Mhz clock period is equal to approximately 80 nanoseconds, the pulse length of the retriggerable monostable 105 is set slightly longer to 100 nanoseconds. This allows some error in the timing components (C4 and R3) period from FF 108. A pulse from the retriggerable monostable 106 causes the 1.544 Mhz clock (SINX) to shift right. The pulse from monostable 106 is synchronized in much the same way as for the monostable 105. When monostable 106 output Q goes high the output of OR gate 109 goes high. FF 111 output Q is normally low, so when FF 125 is clocked its output Q will toggle since the J and K inputs are both equal to a logic one. Sometime after FF 111 clocks the monostable 106 output Q will go low. OR gate 109 output will stay high until FF 111 is clocked again. At this time FF 111 will toggle again and its Q output will go low. The clock for FF 111 is provided by NAND gate 208 output. NAND gate 208 provides a negative pulse once every 1.544 Mhz clock (SINX). NAND gate 208 decodes a 110 (binary) on the ABC output of the 4 bit binary counter 203. Since a pulse from monostable 106 causes a shortened SINX pulse, FF 111 output Q will go high for exactly one shortened SINX pulse or 568 nanoseconds. The pulse length of monostable 106 was set slightly longer to approximately 700 nanoseconds to allow for tolerances in the timing components (C5 and R4).

Counter 203 is a 4 bit binary counter which is used to derive the shifted 1.544 Mhz clock (SINX). counter 203 divides the 12 Mhz clock (actually 12.352 Mhz) by two to provide the A output, by four to provide the B output and by eight to provide the C output. The D output stays low since the counter is cleared before it can go high. The C output provides the SINX output through inverter gate 207. Normally the counter (203) runs like a divide by eight counter, however a pulse from FF 108 or FF 111 will cause it to either divide by 7 or by 9 for one period. This causes the 1.544 Mhz clock to appear to shift ⅛ period left or right. When FF 108 goes low for one clock period, it causes counter 203 to skip a count by disabling the counter for one clock period. A problem can occur if FF 108 goes low when counter 203 is about to be cleared, if the counter were simply disabled it would still be cleared because the chip has a direct clear rather than a synchronous clear. Inverter gate 201 and NAND gate 202 are used to prevent a clear while FF 108 is low (enable T to counter 203). This insures that counter 203 will skip a count regardless of where it is in the cycle. The clear signal is provided by decoder 204 out and is inverted by inverter gate 201. For a clear to occur the output of inverter gate 201 must be high. If FF 108 output $\overline{Q}$ is low when inverter gate 201 goes high, inverter gate 201 will remain high until after FF 108 goes high. Decoder 204 is a 16 to 1 decoder and is used to provide a clear to counter 203. The output is selected from one of the 16 inputs (Data inputs 0-15) depending on the A, B, C and D outputs (from counter 203). If for example A, B, C, and D were all zero, the inverse of Data Input 0 would be sent out to inverter gate 201. Normally Data Input 6 (from FF 111 output Q) is low and the output does not go low (output is data selected and inverted) until ABCD is equal to 1110. When the output goes low counter 203 will be cleared. Due to propagation delays through decoder 204, inverter gate 201 and NAND gate 202 (50 nanoseconds) counter 203 does not get cleared until it is just about to count to eight (ABCD=0001). IF FF 111 output $\overline{Q}$ goes high decoder 204 causes a clear when ABCD is equal 0110 instead of 1110. This causes counter 203 to divide by seven instead of eight for one period. This causes a shortening of the SINX pulse and a decrease in the temperature effect to the connected digital trunk unit. When OR gate 109 skips a clock it lengthens the SINX pulse and an increase in the temperature effect is observed. As mentioned before the SINX clock is shifted 768 times in one direction and then shifted 768 times in the opposite direction. After a number of temperature cycles have occurred the frequency of SINX will average out to exactly 1.544 Mhz. Even during portions of the temperature cycle, frequency variations will be slight. The count of 768 was chosen for this example in that it represents approximately a 70° C. temperature change. This can be made programmable so that a wide range of temperature effects could be simulated. The synchronous 4 bit binary counter 205 is provided as a 1.544 reference and is unshifted).

The rest of the circuit, consisting of counters 301, 302, 303 and gates 304 through 320, is used to count the number of times the signal SINX is shifted and determines the direction in which SINX is shifted. Counters 301, 302, and 303 are connected to form a 12 bit up-/down binary counter. (This is done by tying the borrow outputs to the down inputs and the carry outputs to the up inputs). The counters count left shifts from FF 108 through the up input of counter 301 and right shifts through the down input. The outputs of counters 301, 302, 303 are decoded for the counts of 767 and the 0 limits (the counters count up to 768 and down to zero) which sets or resets the $\overline{Q}$ signal of the latch configuration of NAND gates (319, 320). The upper limit (767) is decoded by gates 307, 310, 304, 305, 316, 317 and 318. If, when the power is initially turned on, the counters are at a value higher than 767, gates 304, 308, and 309 are used to reset the $\overline{Q}$ signal and cause the counters to count down (shift left). 767 is equal to 0010 1111 1111 binary. The least significant bit is represented by counter 301 output A and the most significant bit is represented by counter 303 output D. When the counters reach the count of 0010 1111 1111, the output of NAND gate 304 will go low causing the NAND gate 305 output to go high. At this time inverter gate 310, 308 and 309 outputs will also be high. NAND gate 316 output goes low when both its inputs go high. This causes the NAND gate 317 output to go high and the $\overline{Q}$ signal to reset to zero. If any value higher than 0010 1111 1111 is reached by the counters the signal Q will be reset. If a value of 00110000 0000 is reached NAND gate 305 will go high and signal $\overline{Q}$ is reset as before. If a value of 01 XX XXXX XXXX (X—don't care) is reached the inverter gate 308 output goes low and signal Q is reset through NAND gate 317 and inverter gate 318. If the counter reaches a value of 1 XXX XXXX XXXX the output of inverter gate 309 output goes low and signal $\overline{Q}$ is reset. When the counters reach a value of 0000 0000 0000 the outputs of NOR gates 311, 312 and 314 will all go high which causes NAND gate 315 to go low and the signal $\overline{Q}$ to be set. Since the signal $\overline{Q}$ determines which way the clock is being shifted (whether the monostable multivibrators 108 or 111 is pulsing) it also determines whether the counters are counting up or down. If signal $\overline{Q}$ is high the counters count up and if signal $\overline{Q}$ is low the counters count down.

In the prior described embodiment the following standard commercially available TTL integrated circuits were used. The table below lists the integrated circuits and references an example of the illustration used for a functional unit of such integrated circuit in this specification.

| | | |
|---|---|---|
| 101 | 555 | Timer |
| 305,316 | 7400 | Quad 2 input NAND gate |
| 102,103 | 7404 | Hex inverter gate |
| 315,317 | 7410 | Thriple 3 input NAND gate |
| 202,208 | 7420 | Dual 4 input NAND gate |
| 311,312 | 7425 | Dual 4 input NOR gate |
| 304 | 7430 | Single 8 input NAND gate |
| 107,109 | 7432 | Quad two input OR gate |
| 108,111 | 74112 | Dual J-K with clear and preset |
| 105,106 | 74123 | Retriggerable Mono-Multivibrator with Clear |
| 204 | 74156 | Dual 2 line to 4 line decoders |
| 203,205 | 74161 | Synchronous 4 bit binary counter |
| 301,302 | 74193 | Synchronous 4 bit Up-Down Counter |

What is claimed is:

1. An arrangement for simulating a temperature shift in a digital transmission medium comprising:
   a first source of clock pulses at a fixed multiple of a desired transmission rate,
   a second source of timing interval pulses,
   a pulse counting means driven by said first source of clock pulses enabled by said interval pulses and having an output,
   and a decoding means connected to said pulse counting means output and operated thereby to reset said counting means upon decoding a predetermined count, whereby an output of said counting means results in a simulated temperature modified data transmission rate.

2. An arrangement as claimed in claim 1, wherein said first source of pulses is approximately a 12.352 megahertz frequency.

3. An arrangement as claimed in claim 1 further including a second pulse counting means operated from said clock pulses, and
   a second decoding means and a control means to control said second source of timing interval pulses to change said interval upon decoding a second predetermined number of pulses, whereby the total number of pulses transmitted is limited.

4. An arrangement as claimed in claim 3, wherein said second source of timing interval pulses comprises an oscillator arranged to operate a first and a second monostable pulse length generator, said monostable alternately enabled by said control means.

5. An arrangement as claimed in claim 3, wherein said pulse counting means is operated by said first counting means to skip one clock pulse during each second source timing interval for one mode of operation, and is caused to reset upon a count of 6 for a change in said interval.

6. An arrangement as claimed in claim 1, wherein said first source of clock pulses is eight times the desired transmission rate.

7. An arrangement as claimed in claim 6, wherein said first source of pulses is approximately a 12.352 megahertz frequency.

8. An arrangement as claimed in claim 6, wherein said pulse counting means is reset by said decoding means upon a count of seven.

9. An arrangement as claimed in claim 8, wherein said pulse counting means is operated by said first counting means to skip one clock pulse during each second source timing interval for one mode of operation, and is caused to reset upon a count of 6 for a change in said interval.

10. An arrangement as claimed in claim 8 further including a second pulse counting means operated from said clock pulses, and a second decoding means and a control means to control said second source of timing interval pulses to change said interval upon decoding a second predetermined number of pulses, whereby the total number of pulses transmitted is limited.

11. An arrangement as claimed in claim 10, wherein said pulse counting means is operated by said first counting means to skip one clock pulse during each second source timing interval for one mode of operation, and is caused to reset upon a count of 6 for a change in said interval.

12. An arrangement as claimed in claim 10, wherein said second source of timing interval pulses comprises an oscillator arranged to operate a first and a second monostable pulse length generator, said monostable alternately enabled by said control means.

* * * * *